(12) United States Patent
Feng et al.

(10) Patent No.: US 8,050,153 B2
(45) Date of Patent: Nov. 1, 2011

(54) METHOD FOR ADAPTIVELY DRIVING A TRACKING ELEMENT WITH MECHANICAL DEVIATION AND DEVICE USING THE SAME

(75) Inventors: Wen Chun Feng, Taipei (TW); Hsing Sheng Huang, Taichung County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1304 days.

(21) Appl. No.: 11/460,719

(22) Filed: Jul. 28, 2006

(65) Prior Publication Data
US 2007/0115773 A1    May 24, 2007

(30) Foreign Application Priority Data

Nov. 18, 2005 (TW) ................. 94140561 A

(51) Int. Cl.
*G11B 7/00* (2006.01)
(52) U.S. Cl. ................ 369/44.29; 369/44.35; 369/53.28

(58) Field of Classification Search ............... 369/53.19, 369/53.3, 47.38, 47.47; 360/78.01, 11.07, 360/78.05, 78.08, 78.09
See application file for complete search history.

(56) References Cited

U.S. PATENT DOCUMENTS 5,859,742 A * 1/1999 Takaishi .................. 360/78.01
6,226,242 B1 * 5/2001 Ogata ...................... 369/47.38

* cited by examiner

*Primary Examiner* — Paul Huber
(74) *Attorney, Agent, or Firm* — J.C. Patents

(57) ABSTRACT

The present invention provides a method for adaptively driving a tracking element with mechanical deviation and a driving device using the same. The method comprises the following steps: recording standard moving time and a standard motor current value, supplying driving voltage to a motor for driving a tracking element, detecting a current value of the motor and detecting moving time of the tracking element, and adjusting a driving gain of the motor based on the relation between the current value of the motor and the standard motor current value, and based on the relation between the moving time of the tracking element and the standard moving time of the standard one.

15 Claims, 5 Drawing Sheets

METHOD FOR ADAPTIVELY DRIVING A TRACKING ELEMENT WITH MECHANICAL DEVIATION AND DEVICE USING THE SAME

CROSS-REFERENCE TO RELATED APPLICATION

This application claims the priority benefit of Taiwan application serial no. 94140561, filed on Nov. 18, 2005. All disclosure of the Taiwan application is incorporated herein by reference.

BACKGROUND OF THE INVENTION

1. Field of the Invention

The present invention relates to a method for driving a tracking element and a driving device using the same. More particularly, the present invention relates to a method for adaptively driving a tracking element with mechanical deviation and a driving device using the same.

2. Description of Related Art

FIG. 1A is a view of a driving mechanism of a conventional optical disc drive. The mechanism of the optical disc drive includes a transmission bar 101, an optical head 102, a mirror mount 103, a tracking gear set 104, and a sledge tracking motor 105. The sledge tracking motor 105 pushes the optical head 102 to move along the transmission bars 101 through the tracking gear set 104. The mirror mount 103 is disposed on the optical head 102 for focusing the light beams emitted from inside the optical head 102 to access data. FIG. 1B is a motion graph of the driving mechanism of a conventional optical disc drive. In general, as the optical disc 107 has a large number of tracks, dual stoppers are usually used to reduce the moving time of the optical head 102 to the position to be read. First, the optical head 102 is forced to move a longer distance, for example, across hundreds of tracks, by the sledge tracking motor 105. Next, the mirror mount 103 is forced to move a shorter distance, for example, less than a track, by the stopper 106 inside the optical head, so as to reduce the reading time and improve the precision by division of work.

Referring to FIGS. 1A and 1B, in order to move the mirror mount 103 to the position SD to read the data in the optical disc 107, generally the optical head 102 is forced to move from the position SA to SB by the sledge tracking motor 105. Next, the mirror mount 103 is forced to move from the position SC to SD by the stopper 106 inside the optical head. In general, the principle of the motion mechanism of the optical disc drive is to supply the voltage to the sledge tracking motor 105. When the sledge tracking motor 105 is initiated, the tracking gear set 104 is driven to bring the optical head 102 gliding on the transmission bars 101. Therefore, the optical head 102 is forced to move a long distance, for example, across hundreds of tracks. Next, the stopper 106 inside the optical head (usually a voice coil motor) pushes the mirror mount 103 moving a short distance according to the principle of electromagnetic induction, so as to track more precisely.

When the optical head 102 is moving, in order to make the optical head 102 reach the predetermined position, track crossing signals on the optical disc 107 are detected (i.e., using the radio frequency (RF) and the tracking error (TE) signals for mutual determination) for correcting the position and speed. However, when the friction changes, for example, the friction increases due to the bad engagement of the gear set, the open loop cannot compensate completely. Therefore, the optical disc drive adopting such a gear set is regarded as unqualified.

SUMMARY OF THE INVENTION

An object of the invention is to provide a method for adaptively driving a tracking element with mechanical deviation. The method can overcome poor performance of the tracking servo due to variance factors such as the assembly difference of the tracking element (for example, the difference of the assembly position between the transmission gear and the sledge motor gear during the assembly), aging of the tracking element (for example, the deformation of the gear after a long-term usage), the manufacturing difference of the element (for example, the specification difference of the shape of the gear), expansion due to heat and contraction due to cold or change of in the viscosity coefficient of the lubricant oil due to environmental changes (for example, different temperature and humidity).

Another object of the invention is to provide a driving device for adaptively driving a tracking element with mechanical deviation. This device can overcome poor performance of the tracking servo due to the variance factors such as the assembly difference of the tracking element, aging variance of the tracking element, the manufacturing difference of the element, the environmental change factors.

In accordance with the above and other objects of the present invention, a method for adaptively driving a tracking element with mechanical deviation is provided. In the method, a tracking element is driven by a motor, and the method for driving the tracking element includes the following steps. First, the standard moving time of a standard tracking element and the standard motor current value are recorded. A driving voltage is supplied to a motor for driving a tracking element. The current value of the motor and the moving time of the tracking element are detected. And then, a driving gain of the motor based on the relation between the current value of the motor and the standard motor current value are adjusted based on the relation between the moving time of the tracking element and the standard moving time of the standard one.

The method for adaptively driving a tracking element with mechanical deviation according to the preferred embodiment of the invention further includes supplying a standard driving voltage to a standard motor for driving a standard tracking element to track back and froth once; detecting the current value of the standard motor as the standard motor current value; and detecting the moving time of the standard tracking element as the standard moving time. The step of recording the standard moving time and the standard motor current value includes recording the standard moving time and the standard motor current value into a non-volatile memory. And the step of adjusting a driving gain of the motor includes raising the driving voltage when the current value of the motor is larger than the standard current value; supplying the raised driving voltage to the motor for driving a tracking element to track back and froth once; detecting the moving time of the tracking element; and comparing the moving time of the tracking element and the standard moving time to ascertain whether they are equal. However, when the moving time of the tracking element approaches the standard moving time, the proportion of increasing the driving gain of the motor is determined by the proportion of the raised driving voltage and the standard driving voltage.

According to an aspect of the present invention, the step of adjusting a driving gain of the motor includes reducing the driving voltage when the current value of the motor is lower than the standard current value; supplying the reduced driving voltage to the motor for driving the tracking element to track back and froth once; detecting the moving time of the tracking element, and comparing the moving time of the tracking element and the standard moving time to ascertain whether they are equal. When the moving time of the tracking element approaches the standard moving time, the proportion of reducing the driving gain of the motor is determined by the proportion between the reduced driving voltage and the standard driving voltage. The method for adaptively driving a tracking element with mechanical deviation can be applied to the tracking mechanism of an optical disc drive, and the tracking element includes a sledge tracking element.

According to another aspect of the present invention, a device for adaptively driving a tracking element with mechanical deviation is adopted for controlling a motor to drive a tracing element. The driving device of the tracking element includes a memory, a motor driver, a current detecting circuit and a processor. The memory is used to record the standard moving time and the standard current value. The motor driver, electrically connected to the motor is used to output the driving voltage to the motor in accordance with the control signal for driving the tracking element. The current detecting circuit is electrically connected to the motor for detecting the current of the motor to be adjusted. The processor is electrically connected to the memory, the motor driver and the current detecting circuit for outputting control signal to control the motor driver and measuring the moving time of the tracking element. The processor controls the motor driver to adjust the driving gain of the motor based on the relation between the current value of the motor measured by the current detecting circuit and the standard motor current value recorded in the memory, and based on the relation between the moving time of the tracking element and the standard moving time.

According to an aspect of the present invention, the standard driving voltage is supplied to a standard motor for driving the standard tracking element to track back and froth once for detecting the current value of the standard motor as the standard motor current value, and then the moving time of the standard tracking element as the standard moving time is detected. The memory can be a non-volatile memory. When the current value of the motor is higher than the standard current value, the processor controls the motor driver to raise the driving voltage and supplies the raised driving voltage to the motor for driving the tracking element to track back and froth once to detect the moving time of the tracking element.

According to an aspect of the present invention, when the processor compares and determines that the moving time value of the tracking element is not the same as the standard moving time value, the driving voltage is raised again and the moving time of the tracking element is compared with the standard moving time, wherein when the moving time value of the tracking element approaches the standard moving time value, the proportion of increasing the driving gain of the motor is determined by the proportion between the increased driving voltage and the standard driving voltage. When the current value of the motor is smaller than the standard current value, the processor controls the motor driver to reduce the driving voltage, and supplies the reduced driving voltage to the motor for driving the tracking element to track back and froth once, so as to detect the moving time of the tracking element. Then, when the processor compares and detects that the moving time value of the tracking element is not the same as the standard moving time value, the driving voltage is reduced again and the moving time of the tracking element is compared with the standard moving time. And, when the moving time value of the tracking element approaches the standard moving time value, the proportion of reducing the driving gain of the motor is determined by the proportion between the decreased driving voltage and the standard driving voltage. The device for adaptively driving a tracking element with mechanical deviation can be applied to the tracking mechanism of an optical disc drive. The tracking element includes a sledge tracking element.

As the controller gain of the motor is adjusted according to the load current value of the standard motor by detecting the changes of the load current of the motor, the variance factors affecting the performance of the tracking servo, such as the assembly position difference due to the assembly of the tracking element, the deformation caused due to the aging of the tracking element, the specification difference of the manufactured form of the element, expansion due to heat and contraction due to cold or the change of the viscosity coefficient of the lubricant oil caused by the environmental factors may be effectively reduced.

In order to the make the aforementioned and other objects, features and advantages of the present invention comprehensible, a preferred embodiment accompanied with figures is described in detail below.

DESCRIPTION OF EMBODIMENTS

Figure 1A:
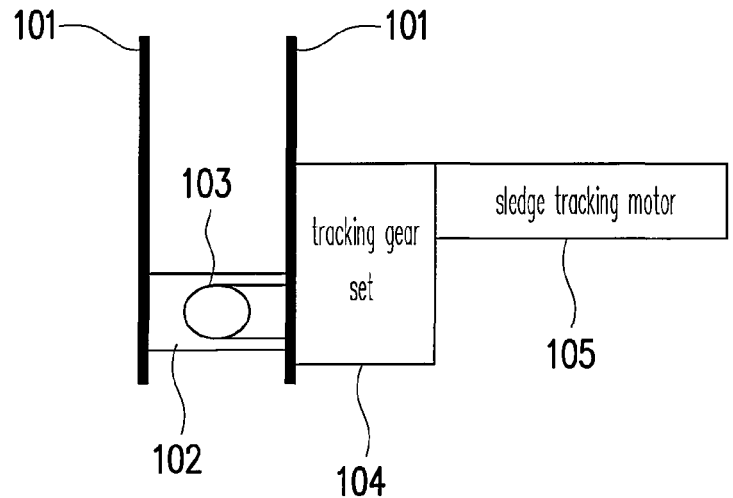
FIG. 1A is a reference diagram of a driving mechanism of a conventional optical disc drive.
Figure 1B:
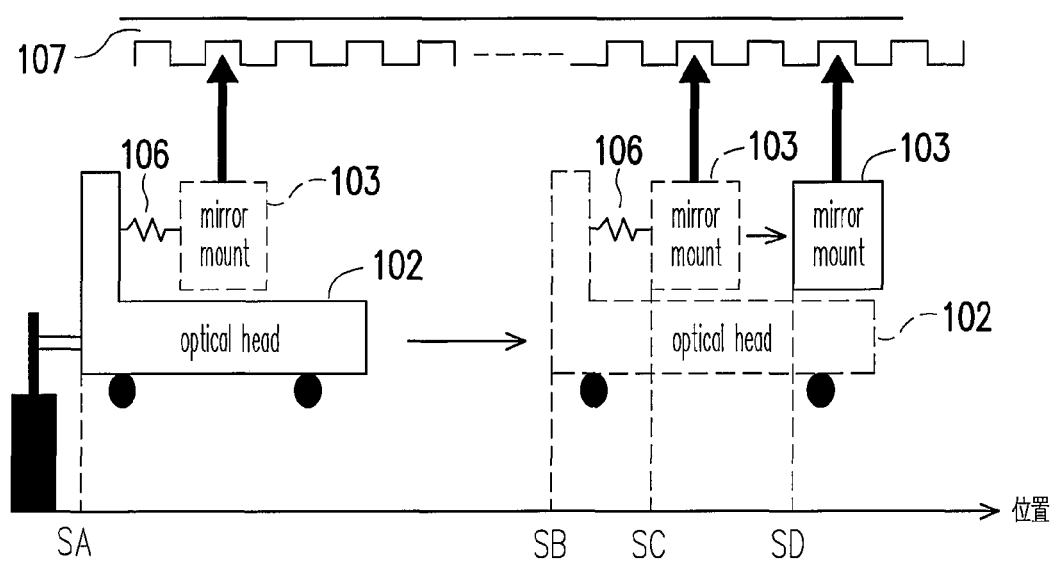
FIG. 1B is a graph showing the motion of the driving mechanism of a conventional optical disc drive.
Figure 2:
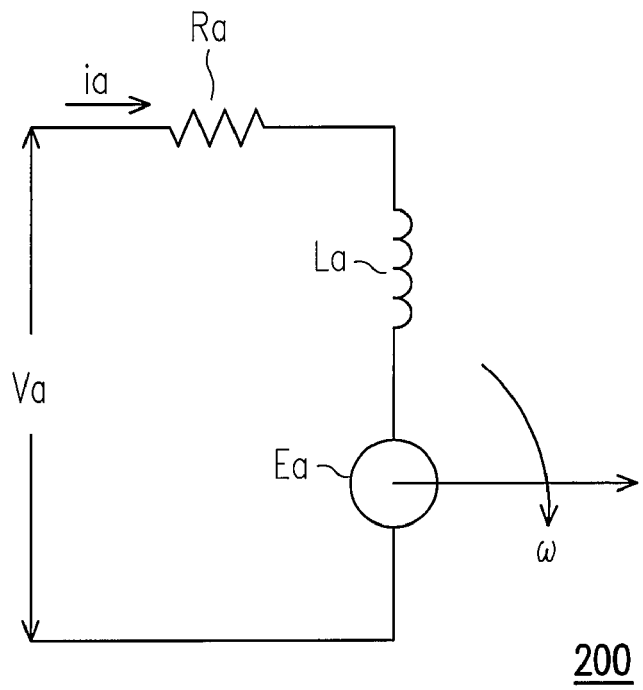
FIG. 2 is a circuit diagram illustrating the tracking DC motor 200.

FIG. 2 is an equivalent circuit diagram illustrating a tracking DC motor 200. The circuit of the DC motor can be represented by the following expression:

$$Va = Ra \cdot ia + La \cdot \frac{dia}{dt} + Ea \tag{1}$$

where, Va represents the voltage at both ends of the DC motor 200; Ra represents the armature resistance; La represents armature inductance; ia represents the current value passing through Ra; t represents time; and $$\left(\frac{dia}{dt}\right)$$

represents a differential of the current value ia to the time t. The expression indicates the voltage distribution inside the tracking DC motor 200. Then, assuming the armature inductance La of the tracking DC motor 200 is 0, the expression (1) is simplified to be the following expression:

$$Va = Ra \cdot ia + Ea \tag{2}$$

The back electromotive force Ea of the tracking DC motor 200 can be represented by the following expression:

$$Ea = Kb \cdot \omega \quad (3)$$

where, Kb represents back electromotive force coefficient, and ω represents the rotational angular speed of the motor. The angular speed ω affects the back electromotive force Ea.

When a constant voltage Va is supplied to the tracking DC motor 200, the tracking DC motor 200 has a constant rotational angular speed ω under the constant friction. Referring to expressions (2) and (3) at the same time, under the constant voltage Va, if the rotational angular speed ω of the tracking DC motor 200 is reduced due to the over friction, the back electromotive force Ea is reduced accordingly. However, under the condition of constant voltage Va, the current value ia is increased. On the other hand, if the angular speed ω of the tracking DC motor 200 is increased due to the reduced friction, the back electromotive force Ea is increased, and under the constant voltage Va, the current value ia is reduced. Therefore, the changes of the friction can be obtained by detecting the changes of the current value ia.

Figure 3:
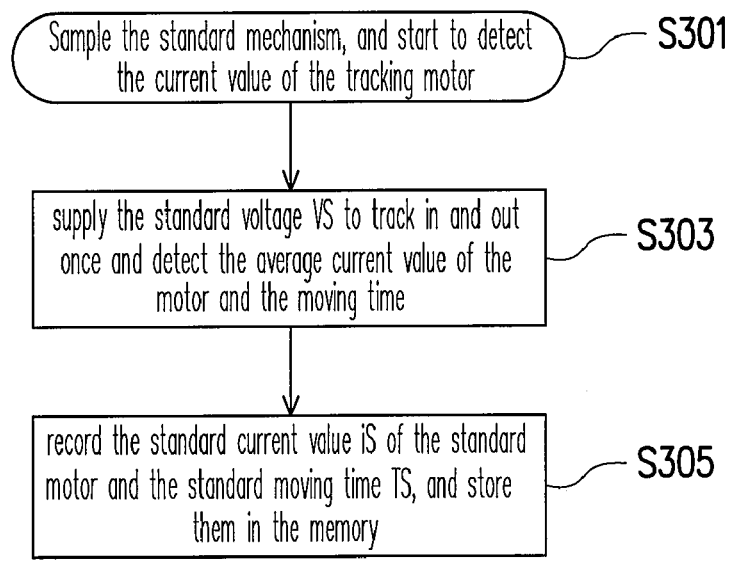
FIG. 3 is a flow chart illustrating the recording of the standard moving time and the current value of the standard DC motor according to the embodiment of the invention.

FIG. 3 is a flow chart illustrating the recording of the standard moving time and the current value of the standard tracking DC motor according to the embodiment of the invention. First, in Step S301, the standard mechanism is sampled and the tracking motor starts to detect. The standard mechanism comprises, for example, a standard motor and a standard tracking element (elements such as a transmission shaft, tracking gear required for moving the optical head) of an optical disc drive. As the standard transmission shaft and the standard tracking gear set are sophisticated and well assembled, a desired tracking time is achieved in reaching the desired track. Next, in Step S303, the standard driving voltage VS is supplied to a standard motor for driving a standard tracking element to track back and froth once, and detecting the average current value of the standard motor as the standard current value iS and the moving time as the standard moving time TS. In Step S303, the design of the tracking element moving back and froth once is that the tracking system moves in the same mechanism model, so the moving distance is fixed. The moving time of the tracking element is detected under the circumstance that the tracking element moves a fixed distance, thereby deducing the condition of the moving speed of the tracking element under the influence of friction. Next, in Step S305, the standard current value iS and the standard moving time TS are recorded and stored in a memory, such as a non-volatile memory. The stored standard current value iS and the standard moving time TS can be taken as a reference when adjusting the voltage gain of other tracking DC motors during mass production, thereby achieving a better tracking performance of various motors. Meanwhile, when the tracking element ages, the standard current value and the standard moving time can also be used as the standard for adjusting the tracking motor of the aging tracking element. The viscosity coefficient of the lubricant oil of the tracking element is influenced by the temperature and humidity in different environmental conditions (for example, the area in the latitude far from the producing area), so that the standard data can also be the reference for adjusting.

Figure 4:
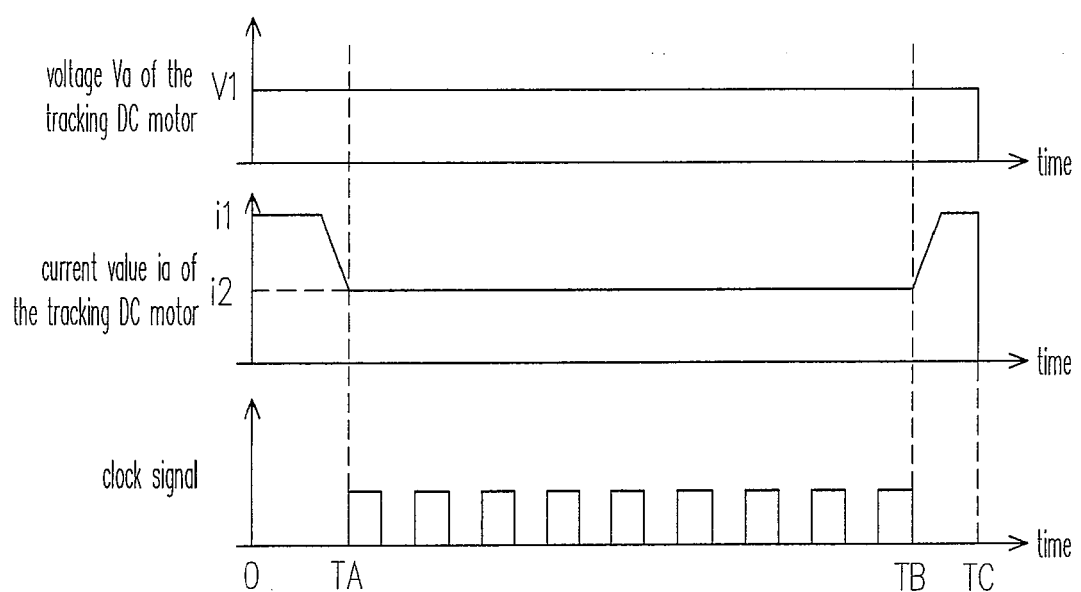
FIG. 4 is a timing diagram of detecting the load degree of the tracking DC motor.

FIG. 4 is a timing diagram of detecting the load degree of the tracking DC motor. Referring to the aforementioned expressions (2), (3) and FIG. 4, the scheme of detecting the current value of the motor and the moving time of the tracking element is illustrated. FIG. 4 indicates the corresponding relation of the voltage Va of the tracking DC motor, the current value ia of the tracking DC motor and the clock signal. During the time period 0~TA, as the tracking element has not moved, the angular speed of the motor is 0 and the current value remains the maximum i1. During the time period TA~TB, as the tracking element starts to move, the rotational angular speed of the motor is increased and the back electromotive force of the motor is increased. While under the constant voltage V1, the current value at this time is reduced to i2. During the time period TB~TC, the tracking element has moved to the outermost track and will stop due to the limitation of the length of the track mechanism, and then the tracking element is at a fixed position. Therefore, the rotational angular speed of the tracking element returns to 0 as the tracking element stops moving, and the current value returns to its maximum i1. As a result, the moving time of the tracking element is represented as TA~TB, and the current value when the motor pushes the tracking element is represented as i2.

Figure 5:
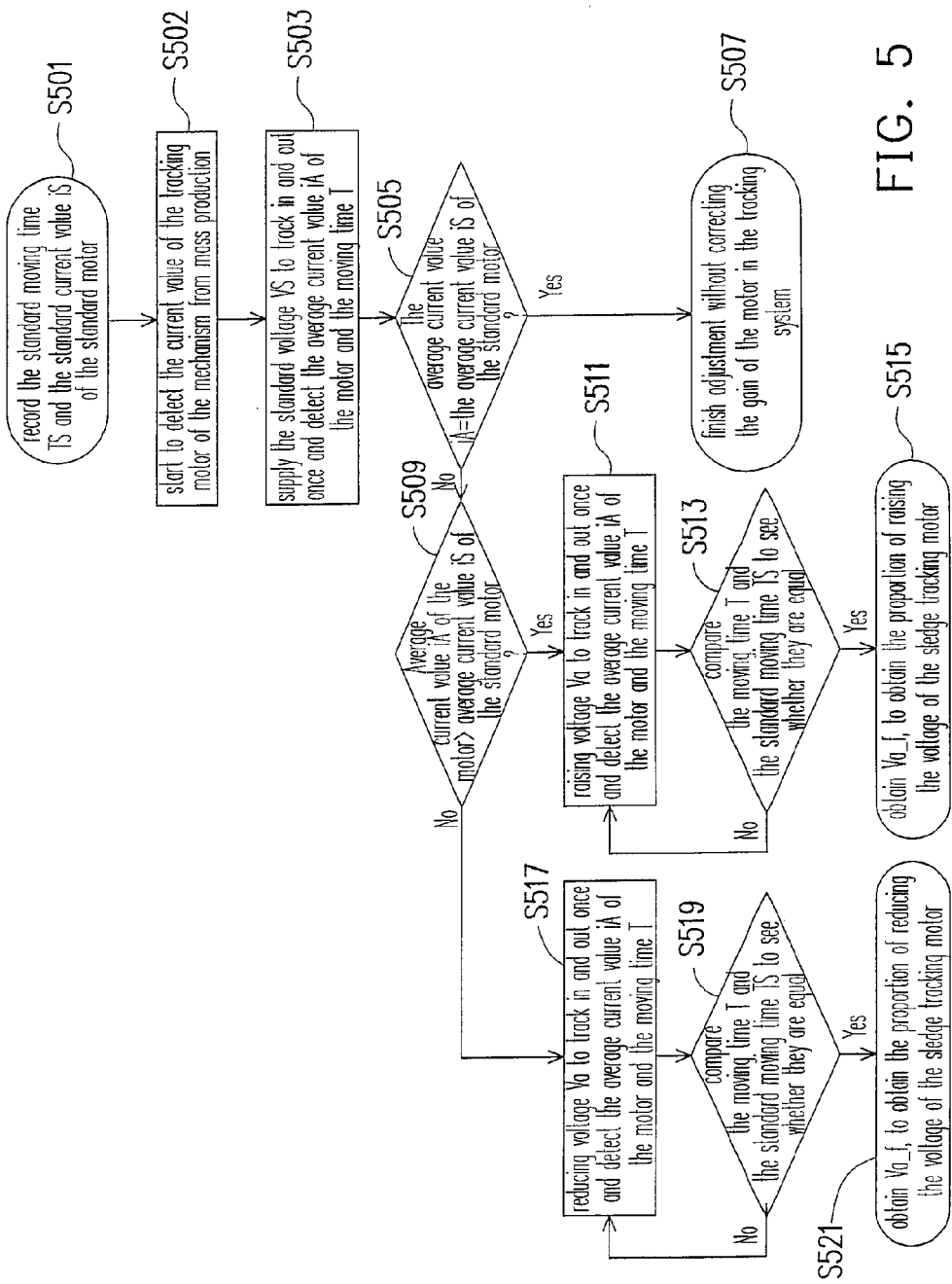
FIG. 5 is a flow chart of the method for adaptively driving a tracking element with mechanical deviation according to the embodiment of the invention.

FIG. 5 is a flow chart of a method for adaptively driving a tracking element with mechanical deviation according to the embodiment of the invention. First, in Step S501, the standard moving time TS and the standard current value iS are recorded, by referring to Steps S301~S305 of recording the standard moving time and the standard motor current value of the standard tracking DC motor in FIG. 3. In Step S502, the current value of the tracking motor of the mechanism from mass production is recorded. In Step S503, the driving voltage Va (the initial value is, for example, the standard voltage VS) is supplied to the motor for driving the tracking element to track in and out once, and then detecting the average current value iA of the motor and the moving time T. Thus, in Step S505, the average current value iA of the motor from mass production and the average current value iS of the standard motor are compared to see whether they are equal. If the average current value iA of the motor is equal to the average current value iS of the standard motor, the procedure proceeds to Step S507, indicating that the adjusting operation is completed without correcting the gain of the motor in the tracking system. If the average current value iA of the motor and the average current value iS of the standard motor are not same, then the procedure proceeds to Step S509 for further determination.

In Step S509, the average current value iA of the motor and the average current value iS of the standard motor are compared. When the average current value iA of the motor is larger than the average current value iS of the standard motor, the angular speed of the motor is reduced due to the increase of the friction, and then proceed to Step S511, i.e., raising the driving voltage Va of the motor for driving the tracking element to track in and out once again and detecting the average current value iA of the motor and the moving time T. Thereafter, in Step S513, the moving time T and the standard moving time TS are compared to see whether they are equal. When the moving time T are not the same as the standard moving time TS, the procedure returns to Step S511 to increase the voltage Va again until the moving time T is equal the standard moving time TS. When the moving time T is equal to the standard moving time TS, the driving voltage Va of the motor is the final voltage Va_f. In Step S515, the proportion of raising the voltage of the tracking motor (Va_f/VS) can be obtained based on the final voltage Va_f and the standard voltage VS. The proportion of increasing the driving gain of the motor is determined by the proportion of raising the voltage, i.e., the driving voltage levels supplied to the tracking motor during the normal operation are all amplified in the same proportion. When the friction of the gears of the tracking element is increased due to the small gear backlash during the manufacture, the voltage can also be adjusted by the driving method, thus the tracking element with mechanical deviation functions properly.

In the above Step S509, if the comparison result is the average current value iA of the motor smaller than the average current value iS of the standard motor, the procedure proceeds to Step S517. In Step S517, the driving voltage Va of the motor is reduced for driving the tracking element to track in and out once again, and detects the average current value iA of the motor and the moving time T. Next, in Step S519, the moving time T and the standard moving time TS are compared to ascertain whether they are equal. When the moving time T and the standard moving time TS are not equal, the procedure returns to Step S517 to reduce the voltage Va until the moving time T is equal to the standard moving time TS. When the moving time T is equal to the standard moving time TS, the driving voltage Va is the final voltage Va_f. In Step S521, the proportion of reducing the voltage of the tracking motor (Va_f/VS) can be obtained based on relation between the final voltage Va_f and the standard voltage VS. Also, the proportion of reducing the driving gain of the motor is determined by the proportion of reducing the voltage, i.e., the driving voltage levels supplied to the tracking motor during the normal operation are all reduced in the same proportion.

The driving method according to the above embodiment can be used for driving the tracking mechanism of an optical disc drive, such as a sledge tracking element. Besides, in the aforementioned embodiment, the above adjustment mechanism can be initiated as desired. Therefore, the method for driving a tracking element can overcome the assembly position variance occurring during the assembly of the tracking element (for example, the over-sized gear backlash of the tracking gear set of the tracking element), thereby remarkably increasing the product yield. Moreover, the method for driving a tracking element according to the above embodiment can also overcome the influences caused by variance factors such as the deformation due to the aging of the tracking element, the specification difference of the manufactured form of the element, expansion due to heat and contraction due to cold or the change of the viscosity coefficient of the lubricant oil caused by the environmental conditions, thereby adaptively and promptly adjust the driving gain of the motor.

Figure 6:
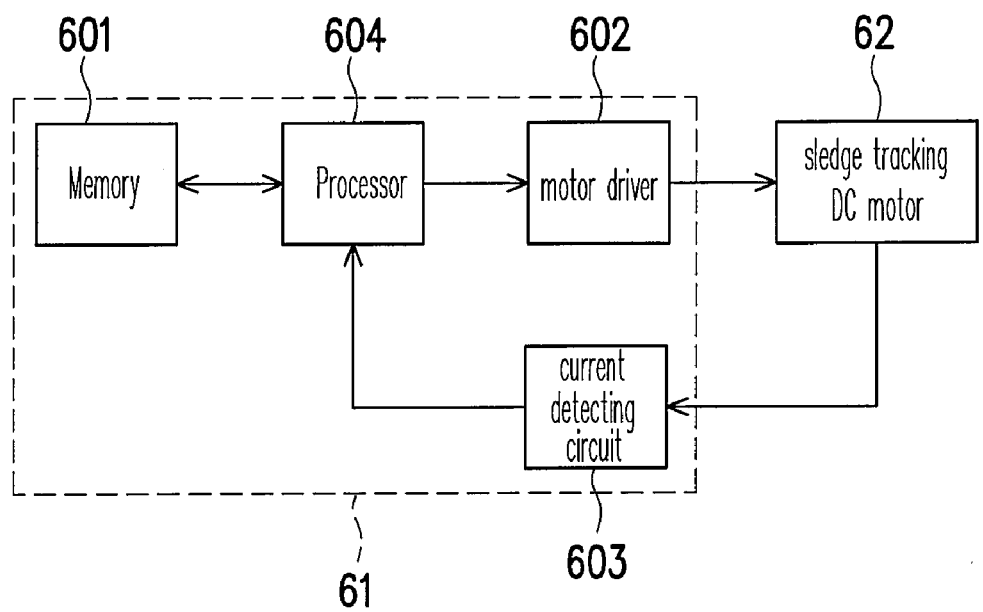
FIG. 6 is a circuit block view of the device for adaptively driving a tracking element with mechanical deviation and a sledge tracking DC motor.

FIG. 6 is a circuit block view of the device for adaptively driving a tracking element with mechanism difference and a sledge tracking DC motor according to the embodiment of the invention. By reference, the device 61 for adaptively driving a tracking element with mechanical deviation controls the sledge DC motor 62 to drive the tracking element (not shown). The driving device 61 includes a memory 601, a motor driver 602, a current detecting circuit 603, and a processor 604. The memory 601 is used to record the standard moving time and the standard current value. The motor driver 602 is electrically connected to the sledge tracking DC motor 62 for outputting the corresponding driving voltage according to the control signal and supplying the driving voltage to the sledge tracking DC motor 62 to drive the tracking element. The current detecting circuit 603 is electrically connected to the sledge tracking DC motor 62 for detecting the current value of the tracking DC motor 62. The processor 604 is electrically connected to the memory 601, the motor driver 602, the current detecting circuit 603, for controlling the motor driver 602 by outputting control signals, and measuring the moving time of the tracking element. The processor 604 controls the motor driver 602 to adjust the driving gain of the sledge tracking DC motor 62 based on the relation between the current value of the sledge tracking DC motor 62 detected by the current detecting circuit 603 and the standard current value recorded in the memory 601, and based on the relation between the moving time of the tracking element and the standard moving time recorded in the memory 601.

The memory 601 of the driving device 61 can be a non-volatile memory. The standard moving time and the standard current value stored in the memory 601 are resulted from supplying the standard driving voltage to the standard motor for driving the standard tracking element to track back and froth once and detecting the current value of the standard motor as the standard motor current value, and detecting the moving time of the standard tracking element as the standard moving time.

After detection by the current detecting circuit 603, when the current value of the sledge tracking DC motor 62 is larger than the standard motor current value, the processor 604 controls the motor driver 602 to raise the driving voltage, and supplies the raised driving voltage to the sledge tracking DC motor 62 for driving the tracking element to track back and froth once, thereby detect the moving time of the tracking element. Then, when the processor 604 compares and determines that the moving time of the tracking element is not equal to the standard moving time, the driving voltage is raised again and the moving time of the tracking element is compared with the standard moving time until the moving time is equal to the standard moving time. When the moving time of the tracking element is equal to the standard moving time, the proportion of increasing the driving gain of the motor is determined by the proportion between the raised driving voltage and the standard driving voltage.

After detection by the current detecting circuit 603, when the current value of the sledge tracking DC motor 62 is smaller than the standard motor current value, the processor 604 controls the motor driver 602 to reduce the driving voltage, and supplies the reduced driving voltage to the sledge tracking DC motor 62 for driving the tracking element to track back and froth once, thereby detect the moving time of the tracking element. Then, when the processor 604 compares and determines that the moving time of the tracking element is not equal to the standard moving time, the driving voltage is reduced again and the moving time of the tracking element is compared with the standard moving time until the moving time is equal to the standard moving time. When the moving time of the tracking element is equal to the standard moving time, the proportion of reducing the driving gain of the motor is determined by the proportion between the reduced driving voltage and the standard driving voltage.

The tracking element can be a sledge tracking element. The device for adaptively driving a tracking element with mechanical deviation can be applied to drive the tracking system of an optical disc drive. However, those skilled in the art should understand the application of the invention is not limited to this and any servo parameters using the changes of the current passing through the tracking DC motor to deduce the friction between the gears and adjust the tracking system fall within the scope of the invention.

In view of the above, the method for adaptively driving a tracking element with mechanical deviation and device using the same is adopted for comparing the moving time of the standard tracking element with the moving time of the tracking element to be adjusted and comparing the current value of the motor to continuously adjust the voltage gain of the motor by supplying different voltages according to different detection results. Therefore, the problems influencing the performance of the tracking element such as the assembly difference, manufacturing difference, differential environmental conditions, and element aging can be overcome. Thus, the product yield, the tracking quality and service life of the tracking element can be effectively increased.

Though the present invention has been disclosed above by the preferred embodiments, it is not intended to limit the invention. Anybody skilled in the art can make some modifications and variations without departing from the spirit and scope of the invention. Therefore, the protecting range of the invention falls in the appended claims.

What is claimed is:

1. A device for adaptively driving a tracking element of an optical disc drive with mechanical deviation, suitable for controlling a motor to drive the tracking element, the device comprising:
   a memory, for recording a standard moving time relating to the tracking element moving within a fixed distance along a moving path;
   a motor driver, electrically connected to the motor, for outputting a driving voltage to supply the motor for driving the tracking element in accordance with a control signal;
   a current detecting circuit, electrically connected to the motor, for detecting a first current value of the motor; and
   a processor, electrically connected to the memory, the motor driver and the current detecting circuit, the processor is configured for outputting the control signal to the motor driver and measuring a first moving time of the tracking element moving along the fixed distance, wherein the processor controls the motor driver to adjust a voltage gain of the motor based on the relation between the first current value measured by the current detecting circuit and a standard motor current value recorded in the memory, and based on the relation between the first moving time and the standard moving time.

2. The device for adaptively driving a tracking element with mechanical deviation according to claim 1, wherein a standard driving voltage is supplied to a standard motor for driving a standard tracking element to track back and forth once along the moving path to detect a second current value of the standard motor as the standard motor current value, and detect a second moving time of the standard tracking element as the standard moving time.

3. The device for adaptively driving a tracking element with mechanical deviation according to claim 1, wherein the memory is a non-volatile memory.

4. The device for adaptively driving a tracking element with mechanical deviation according to claim 1, wherein when the first current value is larger than the standard motor current value,
   the processor controls the motor driver to raise the driving voltage, and supply the driving voltage to the motor for driving the tracking element to track back and forth once to detect the first moving time;
   when the processor compares and determines that the first moving time is not equal to the standard moving time, the driving voltage is raised again and the first moving time is compared with the standard moving time; and
   when the first moving time is equal to the standard moving time, a proportion of increasing the voltage gain of the motor is determined by the proportion between the driving voltage and the standard driving voltage.

5. The device for adaptively driving a tracking element with mechanical deviation according to claim 1, wherein when the first current value is smaller than the standard motor current value,
   the processor controls the motor driver to reduce the driving voltage, and supply the driving voltage to the motor for driving the tracking element to track back and forth once to detect the first moving time;
   when the processor compares and determines that the first moving time is equal to the standard moving time, the driving voltage is reduced again and the first moving time is compared with the standard moving time; and
   when the first moving time is equal to the standard moving time, a proportion of reducing the voltage gain of the motor is determined by the proportion between the driving voltage and the standard driving voltage.

6. The device for adaptively driving a tracking element with mechanical deviation according to claim 1, wherein the device is applicable in driving a tracking mechanism of an optical disc drive.

7. The device for adaptively driving a tracking element with mechanical deviation according to claim 1, wherein the tracking element is a sledge tracking element.

8. A method for adaptively driving a tracking element of an optical disc drive with mechanical deviation by a motor, the method comprising:
   recording a standard moving time relating to the tracking element moving within a fixed distance along a moving path;
   supplying a driving voltage to the motor for driving the tracking element;
   detecting a first current value of the motor and estimating a first moving time from the first current value, at a processor, relating to the tracking element moving within the fixed distance of the tracking element; and
   adjusting a voltage gain of the motor based on the relation between the first current value and a standard motor current value, and based on the relation between the first moving time and the standard moving time, wherein when the first current value is larger than the standard motor current value.
   raising the driving voltage;
   supplying the driving voltage to the motor for driving the tracking element to track back and forth once;
   detecting the first moving time;
   comparing the first moving time and the standard moving time to ascertain whether they are equal; and
   increasing the voltage gain of the motor according to a proportion between the driving voltage and a standard driving voltage when the first moving time of the tracking element is equal to the standard moving time.

9. The method for adaptively driving a tracking element with mechanical deviation by a motor according to claim 8, further comprising:
   supplying a standard driving voltage to a standard motor for driving a standard tracking element to track back and forth once along the moving path;
   detecting a second current value of the standard motor as the standard motor current value; and
   detecting a second moving time of the standard tracking element as the standard moving time.

10. The method for adaptively driving a tracking element with mechanical deviation by a motor according to claim 8, wherein the step of recording the standard moving time and the standard motor current value comprises:
    recording the standard moving time and the standard motor current value in a non-volatile memory.

11. The method for adaptively driving a tracking element with mechanical deviation by a motor according to claim 8, wherein the step of adjusting a voltage gain of the motor further comprises:
    repeating the step of raising the driving voltage until the first moving time is equal to the standard moving time when the first moving time is not equal to the standard moving time.

12. The method for adaptively driving a tracking element with mechanical deviation by a motor according to claim 8, wherein the step of adjusting a voltage gain of the motor comprises:
  when the first current value is smaller than the standard motor current value,
  reducing the driving voltage;
  supplying the driving voltage to the motor for driving the tracking element to track back and forth once;
  detecting the first moving time;
  comparing the first moving time and the standard moving time to ascertain whether they are equal; and
  reducing the voltage gain of the motor according to a proportion between the driving voltage and the standard driving voltage when the first moving time of the tracking element is equal to the standard moving time.

13. The method for adaptively driving a tracking element with mechanical deviation by a motor according to claim 12, wherein the step of adjusting a voltage gain of the motor further comprises:
  when the first moving time is not equal to the standard moving time, repeating the step of reducing the first current value until the first moving time is equal to the standard moving time.

14. The method for adaptively driving a tracking element with mechanical deviation by a motor according to claim 8, wherein the method is suitable for being applied in the tracking mechanism of an optical disc drive.

15. The method for adaptively driving a tracking element with mechanical deviation by a motor according to claim 8, wherein the tracking element is a sledge tracking element.

* * * * *